June 14, 1932.  J. B. STRAUSS  1,862,867
WHEEL
Filed Feb. 28, 1930
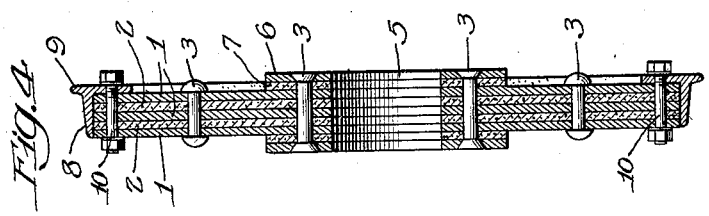
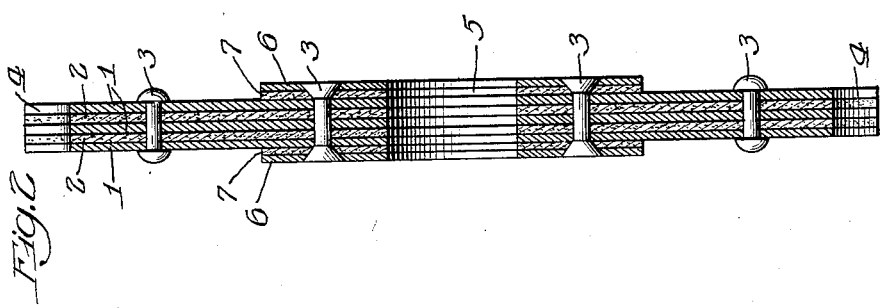
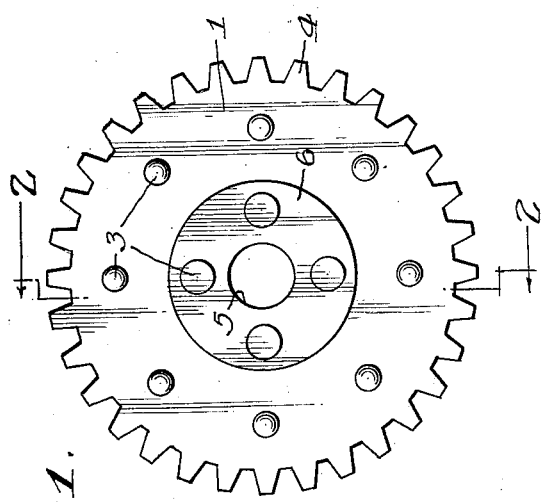
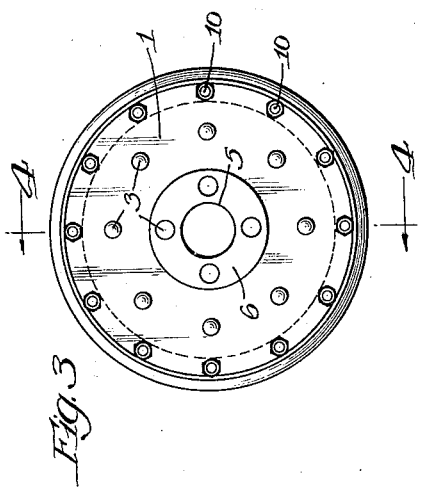
Inventor.
Joseph B. Strauss
By Parker & Carter
Attys.

Patented June 14, 1932

1,862,867

UNITED STATES PATENT OFFICE

JOSEPH B. STRAUSS, OF CHICAGO, ILLINOIS

WHEEL

Application filed February 28, 1930. Serial No. 432,279.

This invention relates to wheels and has for its object to provide a new and improved device of this description.

The invention has a further object to provide a laminated wheel made up of sections placed together, some of the sections being metal and other sections being non-metallic.

The invention has other objects which are more particularly pointed out in the accompanying description.

Referring now to the drawing, Fig. 1 is a view of one form of wheel embodying the invention.

Fig. 2 is an enlarged sectional view taken on line 2—2 of Fig. 1.

Fig. 3 is a view showing a modified construction.

Fig. 4 is an enlarged sectional view on line 4—4 of Fig. 3.

Like numerals refer to like parts throughout the several figures.

Referring now to the drawing, I have shown in the drawing a wheel made up of laminae fastened together. There are certain laminae or sections of metal and other laminae or sections of non-metallic material.

In the construction shown in Figs. 1 and 2, the sections 1 are of metal and the intermediate sections 2 are of non-metallic or cushioning material of any suitable kind. The sections are placed side by side and are then fastened together by suitable fastening devices 3. In the construction shown in Figs. 1 and 2, the wheel is a gear wheel and the different sections are stamped out and provided with teeth 4 at their periphery and with a central opening 5 for a shaft or suitable support.

I prefer to provide at the central opening the outer laminae 6 of metal and the inner laminae or section 7 of cushioning material. In Figs. 3 and 4 I have shown a modified construction made up of the laminae 1 and 2 but instead of having teeth at the periphery, the periphery of the laminae is smooth or unbroken and there is attached thereto a rim 8 with a flange 9. This provides a laminated car wheel. In this construction the fastening devices 10 which fasten the rim in position also assists in fastening the laminae together.

I claim:—

1. A wheel comprising a series of main laminae placed side by side and means for uniting them into a unitary whole the outside laminae on both sides of the wheel being metal, the central portion of the wheel being provided on opposite sides of the main laminae with laminae smaller in diameter than the main laminae and forming the outer sections of the hub of the wheel.

2. A wheel comprising a series of main metal laminae and a main intermediate cushioning laminae and means for uniting them into a unitary whole the central portion of the wheel being provided on opposite sides of the main laminae with metal and cushioning laminae smaller in diameter than the main laminae and forming the outer sections of the hub of the wheel.

3. A wheel comprising a series of main laminae, a unitary rim associated with said main laminae and means for uniting the parts to form a unitary whole the outside laminae on both sides of the wheel being metal, the center of the wheel being provided on each side of the main laminae with laminae smaller in diameter than the main laminae to complete the hub.

4. A wheel comprising a series of main laminae a unitary rim associated with said main laminae and extending laterally across the periphery thereof and means for uniting the parts to form a unitary whole comprising fastening devices which engage the rim and which extend through the main laminae so as to act as fastening devices for said laminae, the two outer main laminae forming the outer faces of the wheel.

Signed at Chicago, county of Cook and State of Illinois, this 12th day of February, 1930.

JOSEPH B. STRAUSS.